US012044370B2

(12) United States Patent
Damhaut et al.

(10) Patent No.: US 12,044,370 B2
(45) Date of Patent: Jul. 23, 2024

(54) MODULAR LED LUMINAIRE ASSEMBLIES WITH SEPARATE MECHANICAL AND ELECTRICAL CONNECTING ELEMENTS

(71) Applicant: Schreder S.A., Brussels (BE)

(72) Inventors: Luc Damhaut, Hervé (BE); Hervé Hortelan, Francorchamps (BE); Samuel Joiris, Flémalle (BE); Koenraad Van Winkel, Duffel (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/929,004

(22) PCT Filed: Feb. 24, 2021

(86) PCT No.: PCT/EP2021/054586

§ 371 (c)(1),
(2) Date: Aug. 10, 2022

(87) PCT Pub. No.: WO2021/170669

PCT Pub. Date: Sep. 2, 2021

(65) Prior Publication Data

US 2023/0099312 A1 Mar. 30, 2023

(30) Foreign Application Priority Data

Feb. 24, 2020 (NL) ...................................... 2024980

(51) Int. Cl.
*F21S 2/00* (2016.01)
*F21V 23/06* (2006.01)
(Continued)

(52) U.S. Cl.
CPC .............. *F21S 2/005* (2013.01); *F21V 23/06* (2013.01); *F21V 31/005* (2013.01); *F21Y 2105/10* (2016.08); *F21Y 2115/10* (2016.08)

(58) Field of Classification Search
CPC ........ F21S 2/005; F21V 15/01; F21V 21/005; F21V 23/06
(Continued)

(56) References Cited

U.S. PATENT DOCUMENTS 7,125,137 B2 * 10/2006 Kitajima ................. F21S 8/032 362/555
7,976,188 B2 * 7/2011 Peng ..................... F21V 29/717 362/249.02

(Continued)

FOREIGN PATENT DOCUMENTS

WO 2014079140 A1 5/2014
WO WO-2014079140 A1 * 5/2014 ................ F21S 2/00

OTHER PUBLICATIONS

PCT International Search Report and Written Opinion, Application No. PCT/EP2021/054586, mailed May 27, 2021, 20 pages.

*Primary Examiner* — Ismael Negron
(74) *Attorney, Agent, or Firm* — McDonnell Boehnen Hulbert & Berghoff LLP

(57) ABSTRACT

A plurality of interconnectable modules includes an electronic module and a first optical module. The first optical module includes a tray with a bottom surface and a side surface, a LED array provided on a printed circuit board disposed on the bottom surface, and an at least partially light-transmitting optical cover closing the tray. The electronic module includes a housing with a bottom wall and a sidewall, a LED driver circuitry for driving the LED array of the printed circuit board, and a door closing the housing. The side surface includes a first electrical connector and a first mechanical connector and the sidewall includes a second electrical connector and a second mechanical connector. The first and second electrical connectors are cooperating to electrically interconnect the electronic module to
(Continued)

the first optical module, while the first and second mechanical connectors cooperate to mechanically secure them together.

15 Claims, 9 Drawing Sheets

(51) Int. Cl.

| | |
|---|---|
| ***F21V 31/00*** | (2006.01) |
| *F21Y 105/10* | (2016.01) |
| *F21Y 115/10* | (2016.01) |

(58) Field of Classification Search
USPC .............................................. 362/219, 217.13
See application file for complete search history.

(56) References Cited

U.S. PATENT DOCUMENTS

| | | | | |
|---|---|---|---|---|
| 8,550,680 | B2 * | 10/2013 | Kim | F21V 3/00 362/217.01 |
| 8,573,805 | B2 * | 11/2013 | Leung | F21V 17/002 362/249.02 |
| 9,544,973 | B2 * | 1/2017 | Dahlen | F21S 2/005 |
| 9,857,070 | B1 * | 1/2018 | Zhou | F21V 31/005 |
| 10,018,343 | B2 * | 7/2018 | Wasserman | F21V 23/0435 |
| 10,386,058 | B1 * | 8/2019 | Cattoni | F21V 29/763 |
| 10,842,895 | B1 * | 11/2020 | Espina | A61L 2/24 |
| 11,300,254 | B2 * | 4/2022 | Zheng | A01G 9/249 |
| 11,333,325 | B2 * | 5/2022 | Burmeister | F21V 19/003 |
| 2013/0322082 | A1 * | 12/2013 | Hollander | F21S 8/04 362/249.02 |
| 2020/0400297 | A1 * | 12/2020 | Hou | F21V 15/012 |

* cited by examiner

MODULAR LED LUMINAIRE ASSEMBLIES WITH SEPARATE MECHANICAL AND ELECTRICAL CONNECTING ELEMENTS

CROSS-REFERENCE TO RELATED APPLICATIONS

The present application is a national stage entry of PCT/EP2021/054586 filed Feb. 24, 2021, which claims priority to NL 2024980 filed Feb. 24, 2020, the contents of each of which are hereby incorporated by reference.

FIELD OF INVENTION

The present invention relates to modular luminaire assemblies, in particular thin modular luminaire assemblies for tunnels.

BACKGROUND

Tunnel lighting solutions need to be designed from different perspectives. They need to be designed for tunnel users looking for a safe and comfortable environment, for tunnel maintenance companies looking for an efficient management, for tunnel installation companies looking for optimal installations with a quick, easy installation and commissioning, and finally for tunnel operators looking for a low total cost of ownership.

Tunnel luminaires must for instance meet stringent considerations in terms of mechanical design, light distributions and mountings. In terms of required light distribution, no two tunnels are identical. Each tunnel has its own criteria in terms of lighting, design and geometry, such that modularity of design is highly relevant for luminaire assemblies in that field.

SUMMARY

The object of the invention is to provide a thin modular luminaire assembly, particularly suitable for tunnel applications.

According to a first aspect of the invention, there is provided a luminaire assembly, in particular for use in tunnels, comprising a plurality of interconnectable modules, said plurality of interconnectable modules comprising at least an electronic module and at least a first optical module. The first optical module comprises at least one printed circuit board comprising at least one corresponding LED array, and at least one corresponding optical plate. The electronic module comprises driver circuitry for driving the at least one LED array of the at least one printed circuit board. The first optical module comprises a tray containing the printed circuit board and the optical plate, and an at least partially light transmitting cover closing said tray, said tray having a bottom face and at least a first edge between said cover and said bottom face. The electronic module comprises a tray containing the driver circuitry and a cover closing said tray, said tray having a bottom face and at least a first edge between said cover and said bottom face. The tray of the first optical module comprises at least a first protrusion protruding outwardly out of the bottom face of said tray and integrating at the first edge a first electrical connector. The tray of the electronic module integrates at the first edge a second electrical connector, which is configured to cooperate with the first electrical connector to electrically interconnect the first optical module and the electronic module. At least one of the first electrical connector and the second electrical connector is configured to bridge over at least one of the first edge of the first optical module and the first edge of the electronic module.

By way of the first protrusion, the thickness of the tray of the optical module is reduced. The tray can indeed be made thin as it only needs to accommodate the printed circuit board and the LED array while the first protrusion provides room for the first electrical connector and the electronic module accommodates the driver circuitry. In this way, the tray of the first optical module is made thin, and easier thus to fix in tunnels with reduced height. Furthermore, a thinner tray implies a reduction of the amount of material used for the tray and energy used for its making leading to a more sustainable and cheap making process.

In addition, by coupling one electronic module and one or more optical modules the design can further be made totally modular to fit the design requirements of any tunnel, in particular in terms of geometry and/or light distribution and/or illuminance. In particular, tunnel lighting must always guarantee that the visual perceptions of drivers are maintained, both day and night, by avoiding sudden variations in lighting levels when entering and exiting a tunnel. This leads to the luminaires in different parts of a tunnel having a different required luminance: a first part of a tunnel being strongly lit over a distance equal to the safe stopping distance to see any possible obstacle inside the tunnel from outside the tunnel, a transition zone with a gradually reduced level of luminance towards the value chosen for the lighting of the interior zone of the tunnel, and an exit zone lit to prepare drivers for their return to external luminance. In that context using different assemblies with different luminance levels by using either one, two or three optical modules for a single electronic module allow the use of the same modules for the entire lighting of a tunnel. For instance assemblies with three modules may be used in zones of the tunnel where a high luminance is required, like the entrance and exit zones. Assemblies with two units may be used in a tunnel zone with an intermediate luminance, like a transition zone. Assemblies with one optical module may be used in tunnel zones with a basic illuminance, like the central interior zone of the tunnel.

Preferred embodiments relate to outdoor luminaire assemblies. By outdoor luminaire, it is meant luminaires which are installed on roads, tunnels, industrial plants, stadiums, airports, harbours, rail stations, campuses, parks, cycle paths, pedestrian paths or in pedestrian zones, for example, and which can be used notably for the lighting of an outdoor area, such as roads and residential areas in the public domain, private parking areas, access roads to private building infrastructures, etc.

Particular preferred embodiments relate to luminaire assemblies for tunnels, or bridges where the luminaire is supported, suspended with respect to a ceiling or an overhang.

In a preferred embodiment, the ratio between the height of the first protrusion and the height of the tray of the optical module is between 0.5 and 1.5. In this way the height of the tray of the optical module can be used to accommodate the printed circuit board while the first protrusion provides room for the first electrical connector. The ratio between the height of the tray and the height of the first protrusion is further related to the reduction of the material and energy expenditure.

In a preferred embodiment, the first edge of the first optical module integrates a first mechanical connector interface and the first edge of the electronic module integrates a second mechanical connector interface configured to cooperate with the first mechanical connector interface to mechanically interconnect the first optical module and the electronic module.

In this way the modules are simultaneously electrically and mechanically connectable, which improves the ease of assembly, as well as the strength of the assembly since the electrical connector may thus contribute to the mechanical rigidity of the assembly.

In a preferred embodiment, the electrical connectors and the mechanical connector interfaces of the first optical module and of the electronic module are configured such that electrical and mechanical contact between the first optical module and the electronic module is realised simultaneously.

In this way, the installation and maintenance are facilitated, since both types of connections may be realised in one step.

Preferably, the first protrusion has a width measured parallel to the first edge of the tray of the first optical module, which is smaller than one third of a width of the tray of the first optical module measured parallel to the first edge thereof, preferably smaller than one fourth of the width of the first optical module. Preferably, the width of the first protrusion is larger than 5% of the width of the tray of the first optical module.

In a preferred embodiment, the first edge of the first optical module has a stepped profile such that the surface of bottom face of the tray is substantially smaller than the surface of the cover and the first mechanical connector interface comprises at least one abutment portion arranged on the stepped profile and configured for abutting against the second mechanical interface.

By way of the stepped profile, the cover is easily positioned and correctly sealed, while more space is created for the mechanical connector interface. Indeed because the first edge of the optical module has a stepped profile, a channel is created between adjacent edges of modules where the mechanical connector interface can be accommodated. In that manner, the best use is made of the available space for a compact and thin design with a limited amount of material. The stepped profile may have a single step profile comprising straight side walls and a flange on which the cover is abutted. Alternatively the stepped profile may have at least two steps with at least two side walls and two flanges. In this way, the first mechanical connector interface may be easily fixed on the side of the tray using usual fixing means, and the first mechanical connector interface may be a separate element.

Preferably, the surface of the bottom face of the tray of the first optical module (which is typically the upper surface in the mounted position) is between 60 and 95% of the surface of the cover of the first optical module.

Preferably, the or each abutment portion has a width measured parallel to the first edge of the tray of the first optical module, which is smaller than one fourth of a width of the tray of the first optical module measured parallel to the first edge thereof.

In a preferred embodiment, the at least one abutment portion extends on a plane perpendicular to the cover plane. In this way, the mounting is provided in a channel between adjacent edges of modules. Indeed because the first edge of the optical module has a stepped profile, a channel between adjacent edges of modules is created where fixing means can be accommodated. In that manner, the best use is made of the available space for a compact design. Preferably, the at least one abutment portion levels with an outer rim of the stepped profile. In this way, when joining an optical module to an electronic module, a physical contact is made simultaneously in two areas: the outer rim of the stepped profile of the tray representing the peripheral edge of the optical module is abutted to the edge of the electronic module and, at the same the abutment portion of the optical module is abutted to the mechanical connector interface of the electronic module. In this manner adjacent modules can be joined edge to edge leading to a compact design.

In a preferred embodiment, the at least one abutment portion comprises two abutment portions arranged on either side of the first electrical connector, preferably in a symmetrical manner.

In this manner, modules are electrically connected in their middle part and mechanically connected on either side of the electrical connection, reinforcing the rigidity of the assembly.

Preferably, at least one abutment portion of the first mechanical connector interface is interconnected to the second mechanical connector interface using a bolt and a nut. Alternatively other means for fixing may be envisaged. In this way, a mechanical connection is realised easily.

In a preferred embodiment the tray of the first optical module has a passage extending from the first edge to a second edge opposite said first edge, said passage integrating the first protrusion. The passage serves as a cable guide to the electrical connectors and simplifies the manufacturing of the optical module. Preferably the passage houses a second protrusion protruding outwardly out of the bottom face of said tray and integrating at the second edge of said tray a third electrical connector for interconnection with the respective electrical connector of a further adjacent module. In this manner the compactness of a thin module due to the first and the second protrusions is further combined with the modularity of the design. Alternatively the first and the second protrusion may be joined to form a single protrusion extending from the first electrical connector to the third electrical connector. The first and the second protrusion will then form the passage protruding out of the bottom face.

Preferably, the passage has a width measured parallel to the first edge of the tray of the first optical module, which is smaller than one third of a width of the tray of the first optical module measured parallel to the first edge thereof, preferably smaller than one fourth of the width of the first optical module. Preferably, the width of the passage is larger than 5% of the width of the tray of the first optical module.

According to a second aspect, there is provided a luminaire assembly, in particular for use in tunnels, comprising a plurality of interconnectable modules, said plurality of interconnectable modules comprising at least an electronic module and at least a first optical module. The first optical module comprises at least one printed circuit board comprising at least one corresponding LED array and at least one corresponding optical plate. The electronic module comprises driver circuitry for driving the at least one LED array of the at least one printed circuit board. The first optical module comprises a tray containing the printed circuit board and the optical plate, and an at least partially light transmitting cover closing said tray, said tray having a bottom face and a first edge between said cover and said bottom face. The electronic module comprises a tray containing the driver circuitry and a cover closing said tray, said tray having a bottom face and a first edge between said cover and said bottom face. The first edge of the first optical module integrates a first mechanical connector interface and said first edge of the electronic module integrates a second mechanical connector interface, which is configured to cooperate with the first mechanical connector interface to mechanically interconnect the first optical module and the electronic module. The first edge of the first optical module has a stepped profile such that the surface of bottom face of the tray is substantially smaller than the surface of the cover and the first mechanical connector interface comprises at least one abutment portion arranged on the stepped profile and configured for abutting against the second mechanical connector interface.

In this way, the cover is easily positioned and correctly sealed on the stepped profile, while more space is created for the mechanical connector interface. Indeed because the first edge of the optical module has a stepped profile, a channel is created between adjacent edges of modules where fixing means can be accommodated. In that manner, the best use is made of the available space for a compact design with a limited amount of material.

In addition, by coupling one electronic module and one or more optical modules the design can further be made totally modular to fit the design requirements of any tunnel, in particular in terms of geometry and/or light distribution and/or illuminance. In particular, tunnel lighting must always guarantee that the visual perceptions of drivers are maintained, both day and night, by avoiding sudden variations in lighting levels when entering and exiting a tunnel. This leads to the luminaires in different parts of a tunnel having a different required luminance: a first part of a tunnel being strongly lit over a distance equal to the safe stopping distance to see any possible obstacle inside the tunnel from outside the tunnel, a transition zone with a gradually reduced level of luminance towards the value chosen for the lighting of the interior zone of the tunnel, and an exit zone lit to prepare drivers for their return to external luminance. In that context using different assemblies with different luminance levels by using either one, two or three optical modules for a single electronic module allow the use of the same modules for the entire lighting of a tunnel. For instance assemblies with three modules may be used in zones of the tunnel where a high luminance is required, like the entrance and exit zones. Assemblies with two units may be used in a tunnel zone with an intermediate luminance, like a transition zone. Assemblies with one optical module may be used in tunnel zones with a basic illuminance, like the central interior zone of the tunnel.

In a preferred embodiment, the at least one abutment portion extends on a plane perpendicular to the cover plane. In this way, the mounting is provided in a channel between adjacent edges of modules, making the best use of the available space for a compact design. Preferably, the at least one abutment portion levels with an outer rim of the stepped profile. In this way, when joining an optical module to an electronic module, a physical contact is made simultaneously in two areas: the outer rim of the stepped profile of the tray representing the peripheral edge of the optical module is abutted to the edge of the electronic module and, at the same the abutment portion of the optical module is abutted to the mechanical connector interface of the electronic module. In this manner adjacent modules can be joined edge to edge leading to a compact design.

Preferably, at least one abutment portion of the first mechanical connector interface is interconnected to the second mechanical connector interface using a bolt and a nut. Alternatively other means for fixing may be envisaged. In this way, a mechanical connection is realised easily.

In a preferred embodiment, the first edge of the first optical module integrates a first electrical connector and the first edge of the electronic module houses a second electrical connector, which is configured to cooperate with the first electrical connector to electrically interconnect the first optical module and the electronic module.

In an exemplary embodiment, the tray of the first optical module comprises at least a first protrusion protruding outwardly out of the bottom face of said tray and integrating at the first edge the first electrical connector.

In a preferred embodiment, the electrical connectors and the mechanical connector interfaces of the first optical module and of the electronic module are configured such that electrical and mechanical contact between the first optical module and the electronic module is realised simultaneously.

In this way, the installation and maintenance are facilitated, since both types of connections may be realised in one step.

In a preferred embodiment, the at least one abutment portion comprises two abutment portions arranged on either side of the first electrical connector.

In this manner, modules are electrically connected in their middle part and mechanically connected on either side of the electrical connection, reinforcing the rigidity of the assembly.

In a preferred embodiment, the tray of the first optical module further integrates at a second edge opposite the first edge a third electrical connector for interconnection with the respective electrical connector of a further adjacent module. In this manner the design is rendered modular.

In a preferred embodiment of the first and second aspect, the first optical module comprises at least two printed circuit boards, each comprising a LED array, and at least two corresponding optical plates configured for generating a non-rotation symmetrical light beam, and wherein the first optical module is configured such that the at least two printed circuit boards and/or the at least two corresponding optical plates are mountable in at least two different positions in the first optical module. In this way, the light distribution can be adapted, creating more flexibility for the use of the luminaire assembly Indeed by using at least two printed circuit boards and at least two optical plates in the same optical module, various combinations for the positioning of the printed circuit boards in the optical module and for the positioning of the optical plates relative to the printed circuit boards can be envisaged. For instance half of the printed circuit boards or half of the optical plates may in a different position than the other half of the printed circuit boards and/or optical plates. For instance in tunnels, symmetrical lighting distribution or asymmetrical counter beam light distribution are desired depending on circumstances. In symmetrical lighting, the light is symmetrically distributed providing a uniform luminance throughout the tunnel but low contrast. In asymmetrical counter beam lighting, the light is asymmetrically distributed with the strongest part of the beam directed toward or respectively away from the approaching driver, providing respectively a negative or positive contrast between an object and the pavement having thus a different luminance. For instance, if all optical plates and printed circuit boards are in the same positions, given their inherent non-rotation symmetrical properties, the optical module will have a counter beam type of lighting and may be used in tunnel zones with a high illuminance, like the entrance and exit zones of the tunnel. For instance if half of the optical plates and/or printed circuit boards are in a different position, the optical module will have a symmetric type of lighting and may be used in tunnel zones requiring a basic or intermediate illuminance, like the transition zone and the central interior zone of the tunnel.

According to a third aspect, there is provided a luminaire assembly, in particular for use in tunnels, comprising a plurality of interconnectable modules, said plurality of interconnectable modules comprising at least an electronic module and at least a first optical module. The first optical module comprises at least two printed circuit boards, each comprising a LED array, and at least two corresponding optical plates configured for generating a non-rotation symmetrical light beam. The electronic module comprises driver circuitry for driving the LED arrays of the at least two printed circuit boards. The first optical module comprises a tray containing the at least two printed circuit boards and at least two corresponding optical plates, and an at least partially light transmitting cover closing said tray. The electronic module comprises a tray containing the driver circuitry and a cover closing said tray. The first optical module is configured such that the at least two printed circuit boards and/or the at least two corresponding optical plates are mountable in at least two different positions in the first optical module.

In this way, the light distribution can be adapted, creating more flexibility for the use of the luminaire assembly. Indeed by using at least two printed circuit boards and at least two optical plates in the same optical module, various combinations for the positioning of the printed circuit boards in the optical module and for the positioning of the optical plates relative to the printed circuit boards can be envisaged. For instance half of the printed circuit boards or half of the optical plates may be in a different position than the other half of the printed circuit boards and/or optical plates. For instance in tunnels, symmetrical lighting distribution or asymmetrical counter beam light distribution are desired depending on circumstances. In symmetrical lighting, the light is symmetrically distributed providing a uniform luminance throughout the tunnel but low contrast. In asymmetrical counter beam lighting, the light is asymmetrically distributed with the strongest part of the beam directed toward or respectively away from the approaching driver, providing respectively a negative or positive contrast between an object and the pavement having thus a different luminance. For instance, if all optical plates and printed circuit boards are in the same positions, given their inherent non-rotation symmetrical properties, the optical module will have a counter beam type of lighting and may be used in tunnel zones with a high illuminance, like the entrance and exit zones of the tunnel. For instance if half of the optical plates and/or printed circuit boards are in a different position, the optical module will have a symmetric type of lighting and may be used in tunnel zones requiring a basic or intermediate illuminance, like the transition zone and the central interior zone of the tunnel.

In addition, by coupling one electronic module and one or more optical modules the design can further be made totally modular to fit the design requirements of any tunnel, in particular in terms of geometry and/or light distribution and/or illuminance. In particular, tunnel lighting must always guarantee that the visual perceptions of drivers are maintained, both day and night, by avoiding sudden variations in lighting levels when entering and exiting a tunnel. This leads to the luminaires in different parts of a tunnel having a different required luminance: a first part of a tunnel being strongly lit over a distance equal to the safe stopping distance to see any possible obstacle inside the tunnel from outside the tunnel, a transition zone with a gradually reduced level of luminance towards the value chosen for the lighting of the interior zone of the tunnel, and an exit zone lit to prepare drivers for their return to external luminance. In that context using different assemblies with different luminance levels by using either one, two or three optical modules for a single electronic module allow the use of the same modules for the entire lighting of a tunnel. For instance assemblies with three modules may be used in zones of the tunnel where a high luminance is required, like the entrance and exit zones. Assemblies with two units may be used in a tunnel zone with an intermediate luminance, like a transition zone. Assemblies with one optical module may be used in tunnel zones with a basic illuminance, like the central interior zone of the tunnel.

In a preferred embodiment of any of the aspects of the invention, the at least two printed circuit boards and the at least two corresponding optical plates are shaped and dimensioned such that each a printed circuit board and/or an optical plate thereof can be rotated over 90° from a first position into a second position. In particular, there is room in the tray and/or fixing means in the tray and on the printed circuit boards, allowing to rotate an optical plate alone or a printed circuit board alone or both a printed circuit board and an optical plate. In this way, multiple light distribution patterns are achieved using the same subparts, creating modularity and versatility. In particular, tunnel lighting must always guarantee that the visual perceptions of drivers are maintained, both day and night, by avoiding sudden variations in lighting levels when entering and exiting a tunnel. This leads to the luminaires in different parts of a tunnel having a different required luminance: a first part of a tunnel being strongly lit over a distance equal to the safe stopping distance to see any possible obstacle inside the tunnel from outside the tunnel, a transition zone with a gradually reduced level of luminance towards the value chosen for the lighting of the interior zone of the tunnel, and an exit zone lit to prepare drivers for their return to external luminance. In that context offering different light distributions with different luminance levels for the same luminaire model allow the use of this model for the entire lighting of a tunnel.

In a preferred embodiment of any of the aspects of the invention, the optical plate is a lens plate having a lens array corresponding with the LED array of the corresponding printed circuit board. In this way, the light distribution of a complete array may be changed easily.

In a preferred embodiment of any of the aspects of the invention, the optical plate has a length and a width, wherein the ratio between the length and the width is between 0.8 and 1.2. In this manner, the optical plate has a rather square shape, facilitating its rotation over 90 degrees relative to the printed circuit board, inside the tray. For example, the optical plate may be a lens plate with a lens array having the same number of columns and rows as the LED array.

In a preferred embodiment of any of the aspects of the invention, the LED array comprises at least nine LEDs and at least three rows. More preferably, the LED array comprises at least sixteen LEDs and at least four rows. Alternatively the array may comprise LEDs arranged in a single row. In this manner, the shape of the luminaire may be varied to accommodate longer modules, with extruded trays rather than moulded trays.

In a preferred embodiment of any of the aspects of the invention, the at least two circuit boards and/or the at least two optical plates are mountable in a first position for counter beam lighting in a tunnel and in a second position for symmetric lighting in a tunnel. In this manner, the light distribution can be adapted to the position of the luminaire in its environment. Alternatively, the circuit boards are mountable in a mix of positions inside the same optical module for combining counter beam lighting and symmetric lighting.

In a preferred embodiment of any of the aspects of the invention, the tray of the first optical module has a first edge comprising a first electrical connector, and the tray of the electronic module has an edge comprising a second electrical connector which is configured to cooperate with the first electrical connector. The tray of the first optical module has a passage extending from the first electrical connector at the first edge to a second edge opposite said first edge, wherein the at least two printed circuit boards are arranged adjacent said passage. Wires for connecting the printed circuit boards and the first electrical connector may be arranged in that passage. In this way, a compact design of the tray is realised, as in particular the wiring inside the module is optimized. Preferably the passage is a central passage, and the at least two printed circuit boards are arranged on either side of said passage.

In a preferred embodiment of any of the aspects of the invention, the tray of the first optical module has a bottom face and the passage protrudes outwardly out of the bottom face. In this way the design of the luminaire assembly is rendered compact and the modules thin.

In a preferred embodiment of any of the aspects of the invention, the passage is provided at the second edge with a further electrical connector for connection to a further module.

In a preferred embodiment of any of the aspects of the invention, a further module which is selected from a sensor module, a signaling module and an optical module is provided, said further module having an electrical connector which is configured to be connected to a further electrical connector of the first optical module. In this way, additional functionalities are provided and integrated in the compact design of the luminaire assembly.

In a preferred embodiment of any of the aspects of the invention, the first optical module comprises four printed circuit boards each comprising a LED array and four corresponding optical plates.

In a preferred embodiment of any of the aspects of the invention, for each optical module, the tray is provided with an additional protrusion, provided with a plug for transmitting additional data between the modules. Preferably, the additional protrusion is similar to the first protrusion creating two passages that may be arranged in parallel, one passage for the electrical channel accommodating at its end the electrical connector and one passage for the data channel accommodating at its end a data connector. Alternatively, the two protrusions may form only one passage which is broader and may accommodate at its end both the electrical connector and a data connector.

In exemplary embodiments with a tray having a stepped profile, the stepped profile may comprise exactly one step. However in other embodiments, the stepped profile may comprise two or more steps.

In an exemplary embodiment, the tray of the first optical module made of an aluminium material, e.g. by injection moulding and/or extrusion. In such embodiments, usually a step profile with two or more steps is preferred.

In another exemplary embodiment, the tray of the first optical module is made of stainless steel, e.g. by folding sheet metal. In such embodiments, a stepped profile with a single step may be beneficial.

The features of the different aspects and embodiments described above may be combined in any possible way.

BRIEF DESCRIPTION OF THE FIGURES

This and other aspects of the present invention will now be described in more detail, with reference to the appended drawings showing currently preferred embodiments of the invention. Like numbers refer to like features throughout the drawings FIGS. 1 and 2 schematically illustrate perspective views of a luminaire assembly according to an exemplary embodiment of the invention, with either two or three modules.

DESCRIPTION OF THE EMBODIMENTS

Preferred embodiments relate to outdoor luminaire assemblies. By outdoor luminaire, it is meant luminaires which are installed on roads, tunnels, industrial plants, campuses, parks, stadiums, airports, harbours, rail stations, cycle paths, pedestrian paths or in pedestrian zones, for example, and which can be used notably for the lighting of an outdoor area, such as roads and residential areas in the public domain, private parking areas, access roads to private building infrastructures, etc. Particular preferred embodiments relate to luminaire assemblies for tunnels, or bridges where the luminaire is supported, suspended with respect to a ceiling.

Figure 1:
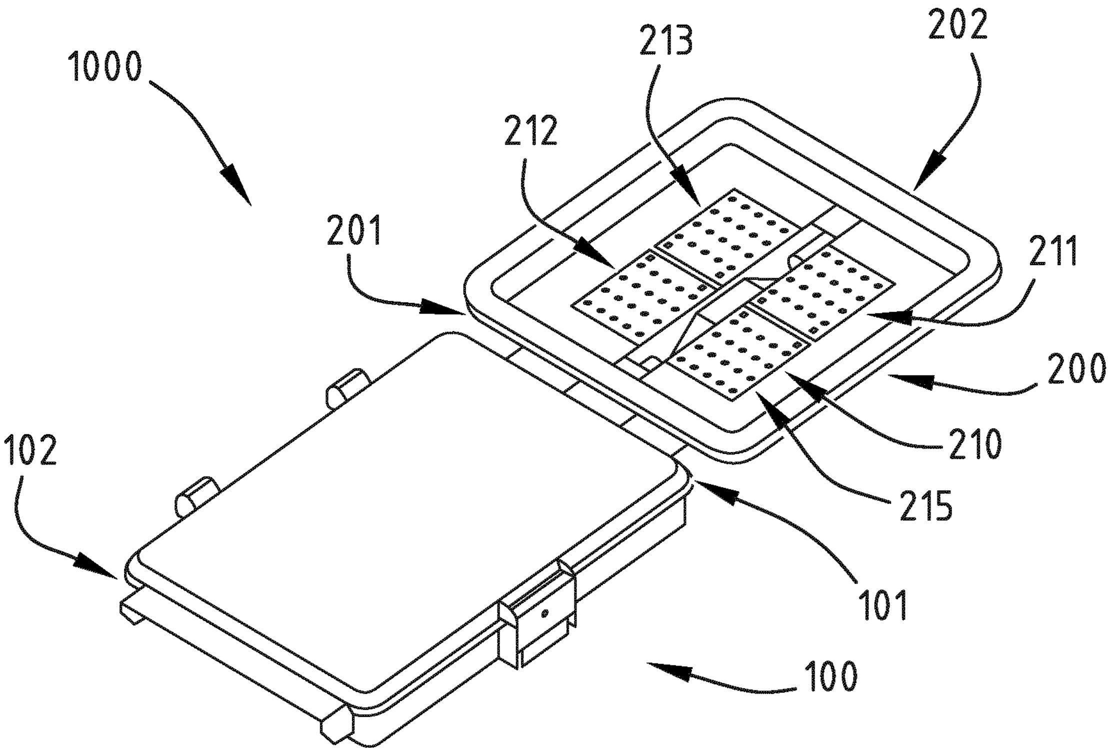

FIG. 1 shows a first luminaire assembly 1000 according to a first embodiment of the invention. The luminaire assembly 1000 may comprise an electronic module 100 and a first optical module 200. The optical module 200 is meant to light the inside of a tunnel, such that FIG. 1 represents a view from below when the luminaire assembly would be installed in a tunnel for instance. The electronic module 100 and the first optical module 200 are shaped like thin boxes sharing preferably substantially the same breadth to obtain a compact assembly. The first optical module 200 comprises four printed circuit boards 210, 211, 212, 213. Each circuit board 210-213, comprises a LED array 215. The electronic module 100 comprises a driver circuitry for driving the LED arrays of the printed circuit boards 210-213. In particular the electronic module 100 may comprise a driver for driving the LED arrays 215 on the printed circuit boards 210 and 211 and another driver for driving the LED arrays 215 on the printed circuit boards 212 and 213 in order to control the two sets of printed circuit boards independently. A first edge 201 of the optical module 200 is connected mechanically to a first edge 101 of the electronic module 100. At the edges 101 and 201, an electrical connection is also provided from the electronic module 100 to the optical module 200 in order to provide power to the LED array 215. A second edge 202 of the optical module 200 as well as a second edge 102 of the electronic module 100 are further independently connectable to a tunnel ceiling or intermediate connection frame to the ceiling. It is noted that the number of LED arrays 215 in the first optical module may be less than four. Further the LED arrays 215 may be rotated over 90° or 180° in order to modify the light distribution.

Figure 2:
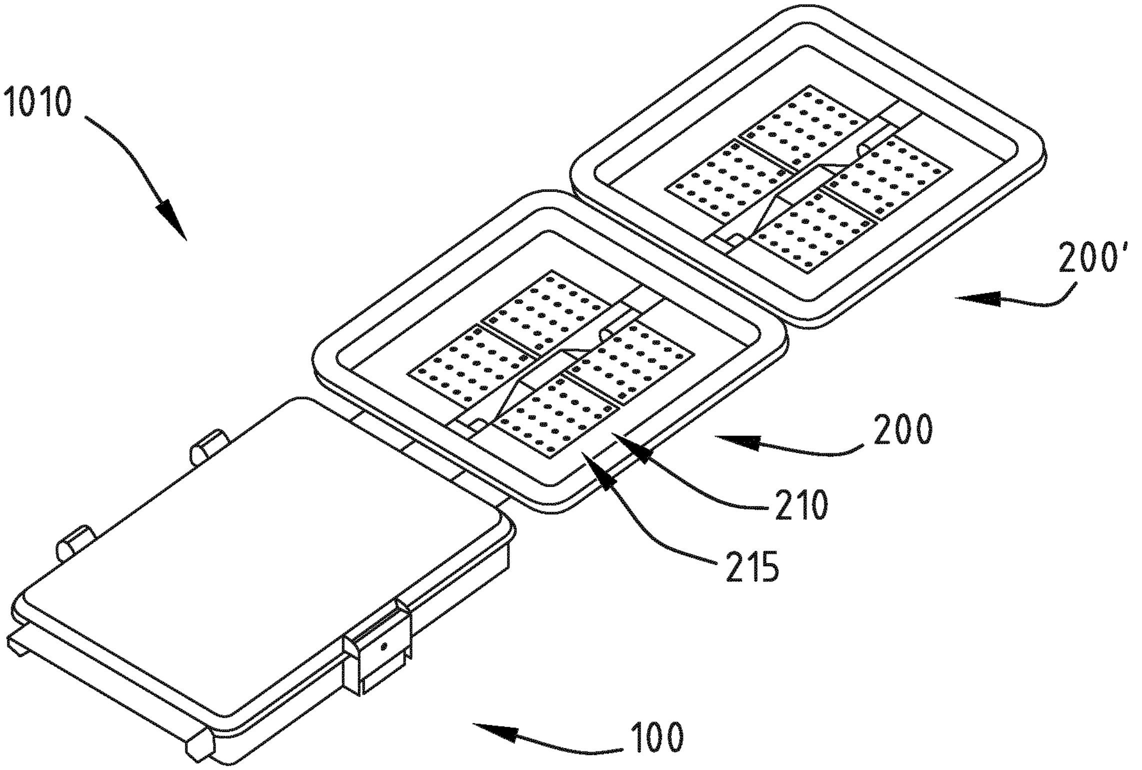

FIG. 2 shows another luminaire assembly 1010 according to the first embodiment of the invention comprising further an additional second optical module 200' connected in series with the first optical module 200 and the electronic module 100. The second optical module 200' may be identical to the first optical module 200 and is connected to the first optical module at the second edge 202 of the first optical module 200, creating a mechanical alignment of modules in series. The assembly could further comprise additional optical modules in series. A skilled person would understand that the modularity of the arrangement may be further adapted to the needs of the lighting situation. In particular different sort of assemblies, differing in the number of optical modules connected to a single electronic module, may be used in different parts of the tunnel based on the luminance and the light distribution required in said parts of the tunnel. For instance assemblies with three modules may be used in zones of the tunnel where a high luminance is required, like the entrance and exit zones. Assemblies with two units may be used in a tunnel zone with an intermediate luminance, like a transition zone. Assemblies with one optical module may be used in tunnel zones with a basic illuminance, like the central interior zone of the tunnel. The whole tunnel may then be illuminated by a combination of many assemblies with various numbers of modules in order to cover the whole length of the tunnel.

Also the required light distribution may be different in different parts of a tunnel. For example, some parts may require only a lighting of the road whilst other parts may require lighting of the walls. By suitably choosing the number, orientation and type of LED arrays and optical modules, this can be easily achieved.

The electronic module 100 is enabled to drive all the optical modules connected to it. In particular the electronic module 100 may comprise a driver for half of the LED arrays 215 of every optical module and another driver for the other half of the LED arrays 215 of every optical module in order to control the two sets of printed circuit boards independently.

Figure 3:
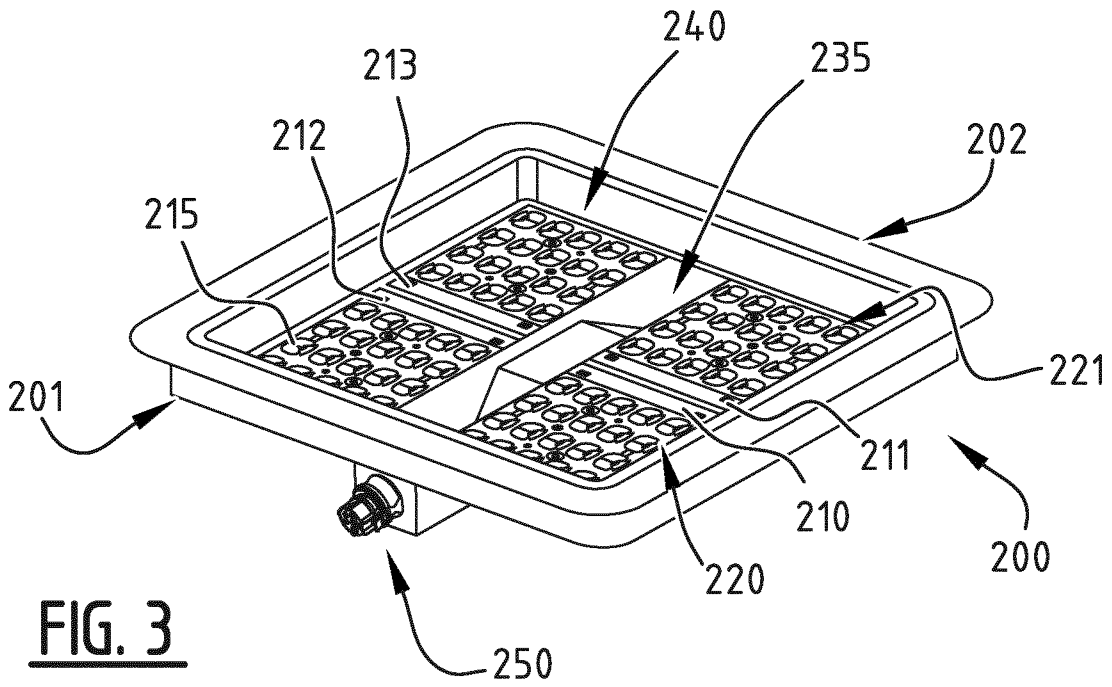
FIGS. 3 and 4 schematically illustrate front and back perspective views of an optical module as shown in FIGS. 1 and 2.
Figure 4:
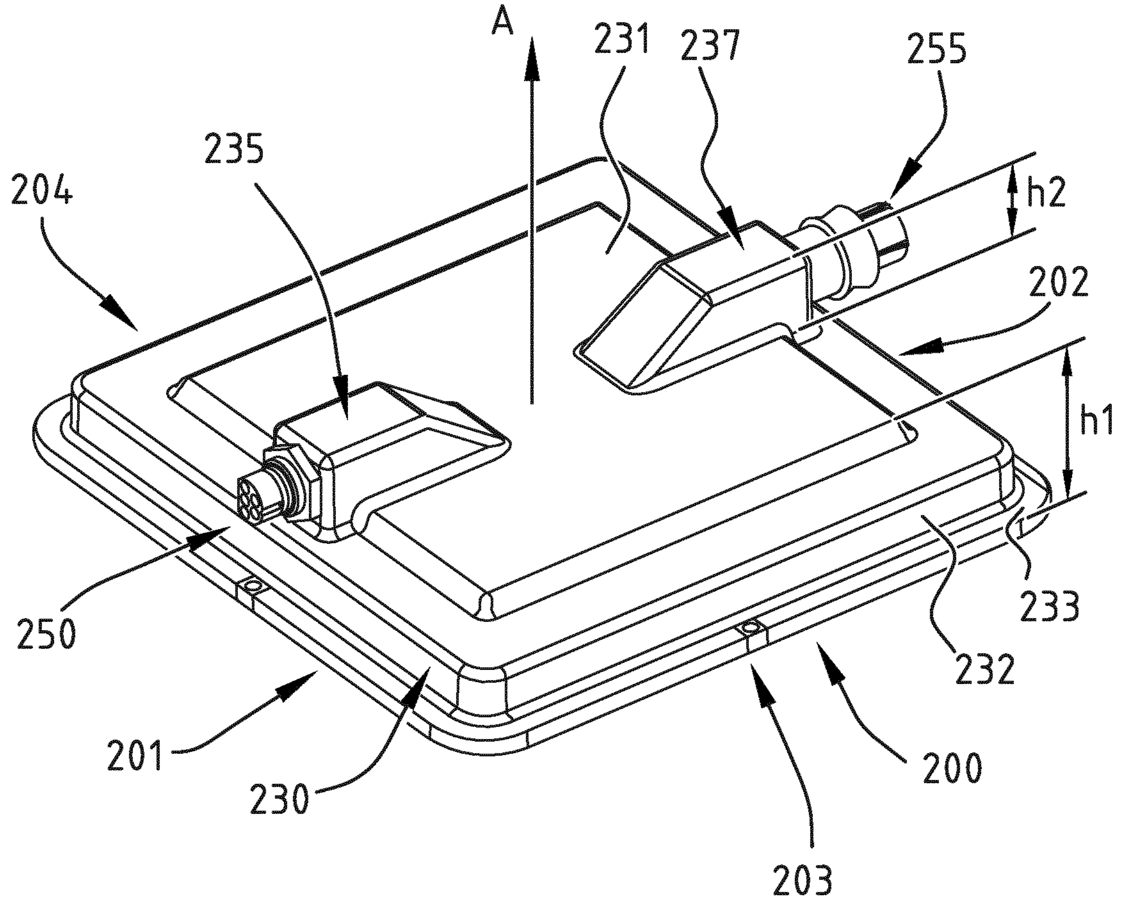

FIGS. 3 and 4 show detailed front and back perspective views of an optical module 200. The optical module 200 comprises a box-shaped tray 230 and a cover 240. The tray 230 has four edges 201-204, each having a stepped profile with a single step. The stepped profile 232, 233 is such that the surface of a bottom face 231 of the tray 230 is smaller than the surface of the cover 240. The stepped profile comprises an upright side wall 232 extending upwardly from the bottom face 231 and an outwardly extending flange 233. The at least partially light transmitting cover 240 is abutting against the flange 233 of the tray 230 to seal the inside of the module 200 and close the tray 230. Inside the tray 230 and the cover 240, are housed four printed circuit boards 210-213, on which a plurality of LEDs 215 are mounted. Each printed circuit board 210-213 comprises an LED array of LEDs in rows and columns. On top of each circuit board 210-213, an optical plate 220-223 is arranged for generating a non-rotational symmetrical light beam. Based on the relative mounting of the circuit boards to their optical plates either a counter beam light distribution or a symmetric light distribution for the whole optical module 200 can be achieved. In FIG. 3, the optical plates 221 and 223 have the same relative position to their respective circuit boards 211, 213, while the optical plates 220 and 222 are rotated 180 degrees compared to the plates 221 and 223 and define a second position with respect to their relative circuit boards 210 and 212. The combination of all boards 201-213 and plates 220-223 create in the shown case a symmetric lighting. An edge 201 of the tray 230 comprises a protrusion 235 protruding outwardly out of the bottom face 231 of the tray 230 and integrating at that edge an electrical connector 250. The protrusion 235 extends from a central part of the bottom face 231 towards the edge 201 such that the connector 250 bridges over the central part of the edge 201. The electrical connector 250 may be a commercially available connector, selected for its insulation properties against water and dirt amongst others. A similar protrusion 237 and a similar electrical connector 255 are present on the opposite edge 202 of the optical module 200. Both protrusions 235 and 237 provide a central passage inside the tray 230 for the electrical wiring towards the printed circuit boards 210-213 and the electrical connectors 250 and 255. The protrusions 235 and 255 extend with a height h2 in the direction A perpendicular to the bottom face 231 of the tray 230, the height h2 having a ratio between 0.5 and 1.5 to the depth h1 of the tray 230 between the bottom face 231 and the top of the edges 201-204 of the tray 230 in the direction A. The protrusions 235, 237 allow reducing the material used for the tray 230 and enable a thin module with a height h2 determined by the space necessary for the boards 210-213 and the optical plates 220-223, while the large commercially-available connectors 250 and 255 are decentred to the protrusions 235 and 237.

Figure 5:
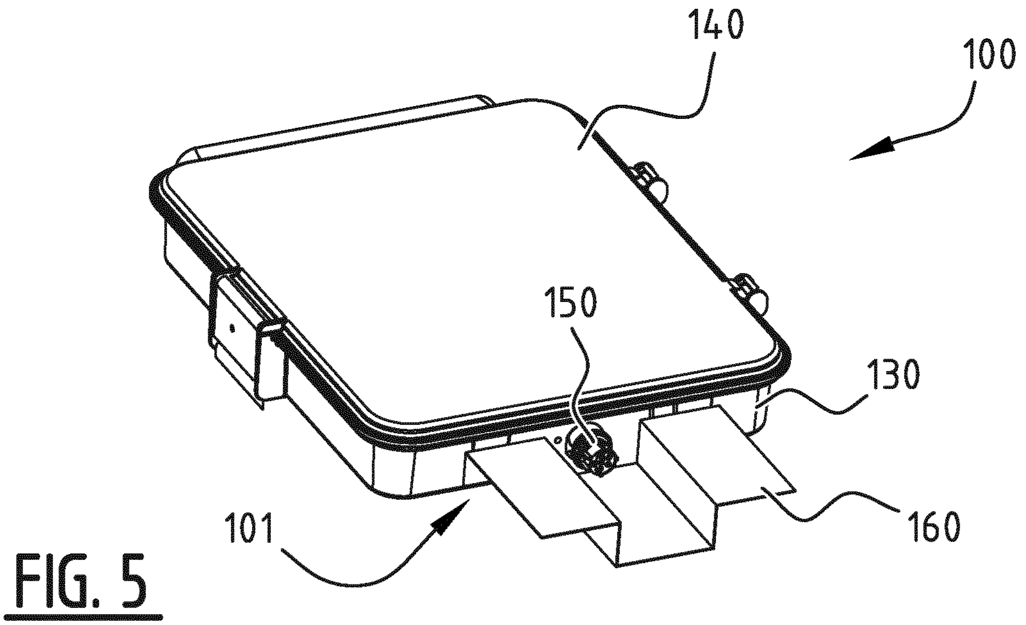
FIGS. 5 and 6 schematically illustrate respectively a perspective view and a partially transparent top view of an electronic module as shown in FIGS. 1 and 2.
Figure 6:
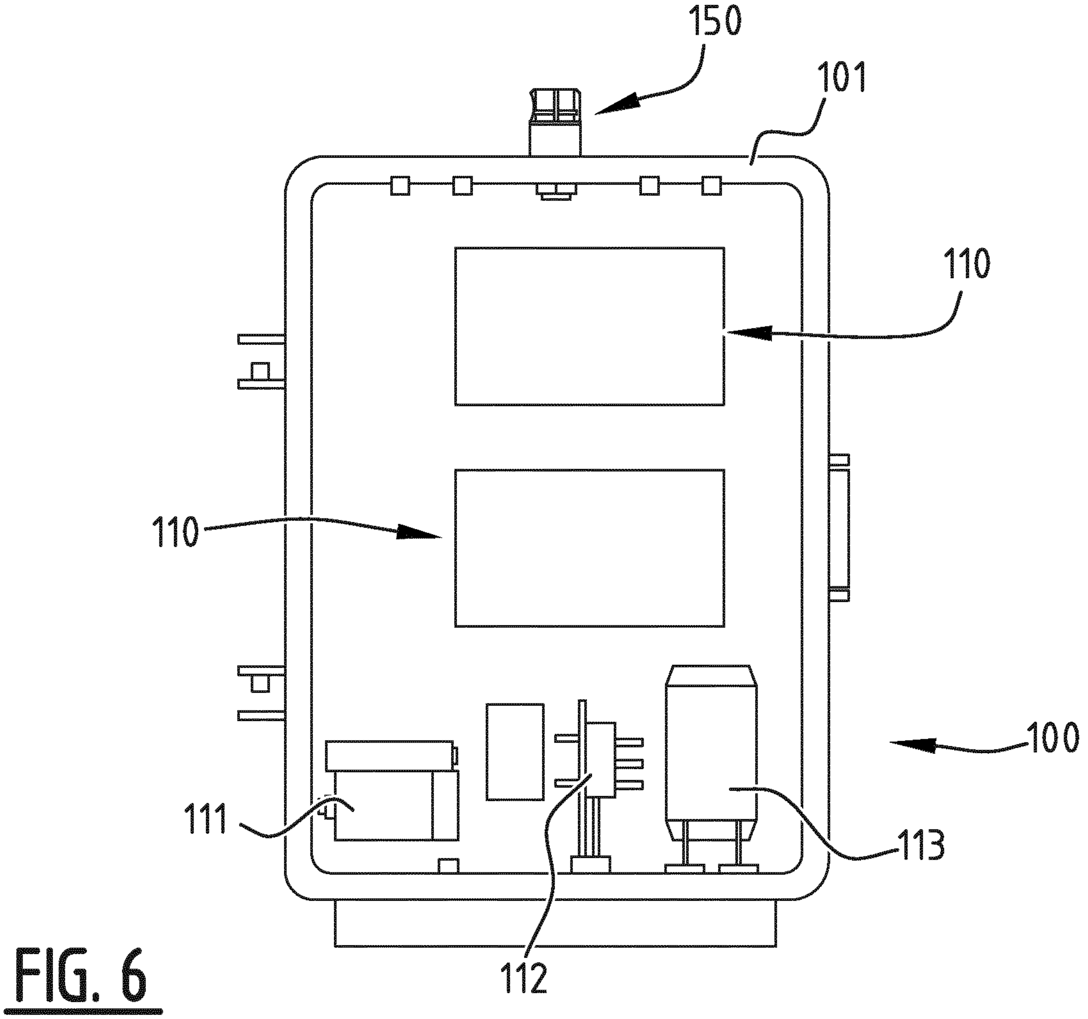

FIGS. 5 and 6 show respectively a perspective view and a partially transparent top view of an electronic module 100 according to the first embodiment. The electronic module 100 comprises a box-shaped tray 130*s* and a cover 140 closing the tray 130. The cover 140 is abutting against the tray 230 to seal the inside of the module 100. Inside the tray 130 and the cover 140, circuit boards of the driver circuitry 110, typically included in one or more driver housings, as well as protection elements 111 including for instance a fuse and a surge protection device, and/or an EMC filter 112 and/or a communication and/or a control interface 113 may be housed. On the central part of one edge 101 of the tray 130, an electrical connector 150 is provided. The electrical connector 150 is interconnectable with the electrical connector 250 of the optical module 200 as respectively fitting female and male connectors which can be plugged together. A mechanical connector 160 is also provided at the edge 101 to interconnect the electronic module 100 and the optical module 200. The mechanical connector is a separate element fixed by additional means like screws to both edges 101 and 201 at the same time as the electrical connectors are interconnected, plugged together.

Figure 7:
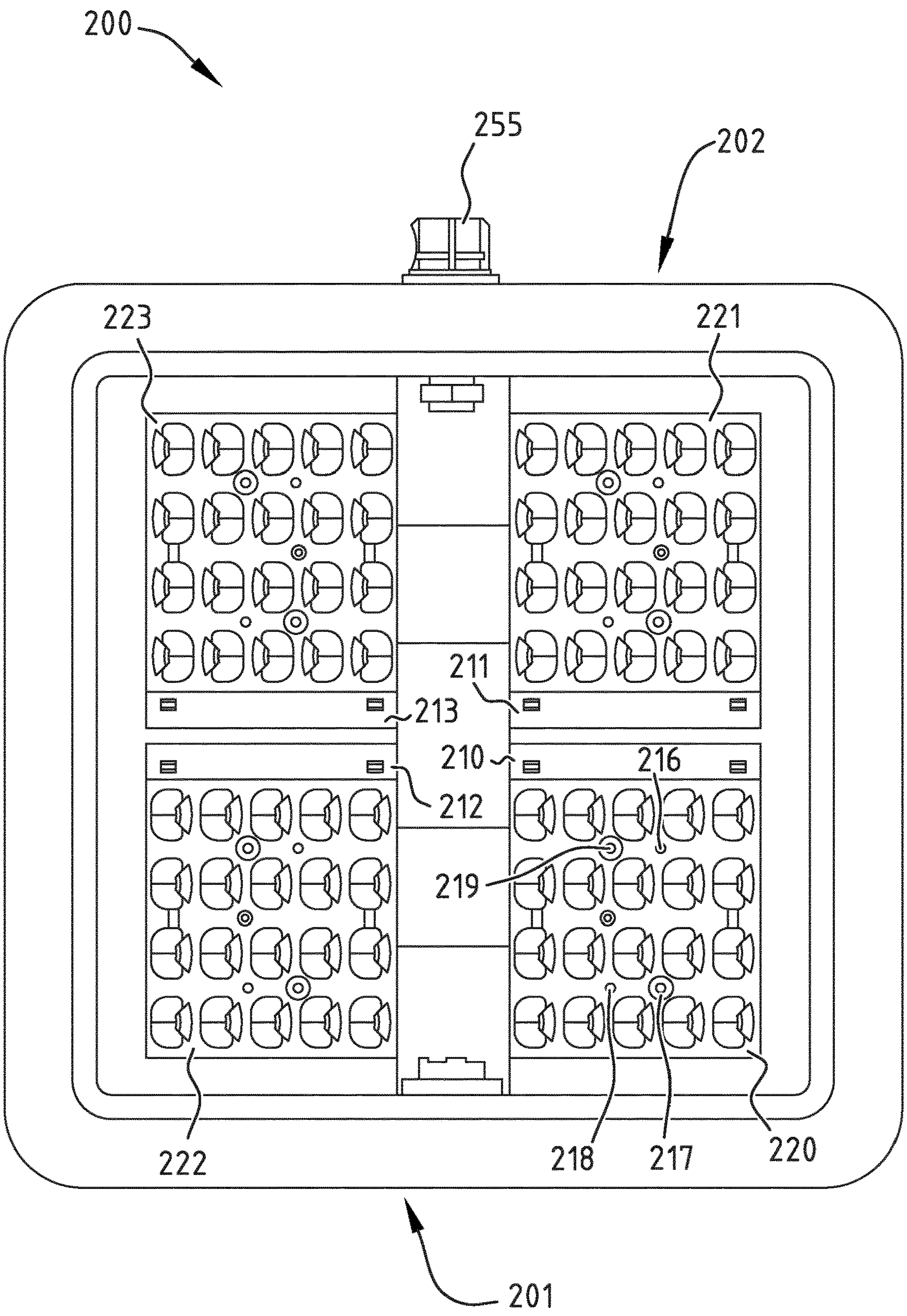
FIG. 7 schematically illustrates a close-up top view of an optical module as shown in FIGS. 1-3.

FIG. 7 shows a close-up top view of an optical module according to the first embodiment and is used for illustrating exemplary optical properties of the optical plates 220-223 and the circuit boards 210-213. The bottom face 231 of the tray 230 of the module 200 may have a rectangular, e.g. substantially square, shape and the optical plates 220-223 and the printed circuit boards 110-113 may have a length and a width. In particular the ratio between the length 1 of the optical plates and the width of the optical plates w may be between 0.8 and 1.2. The optical plates 220-223 may be fixed above the circuit boards 110-113 in two positions rotated by 180 degrees from each other. Fixing means 216-219 may be provided on the tray 230 to allow fixing the optical plates 220-223 and the printed circuit boards 110-113 in several ways. For instance, prefabricated holes 216-219 may be used for fixing the optical plate 220 and the printed circuit board 210 in several configurations by using either 217 and 219 for a first, as represented here, orientation of the optical plate, or 216 and 218 for a 180 rotated second position of the optical plate. Although reference numbers have only been introduced for the fixing means 216-219 relating to the optical plate 220 and the printed circuit 110, similar fixing means may be provided for all printed circuit boards and optical plates.

It is here further noted that, in FIG. 7, all printed circuit boards are represented as rectangular shaped circuit boards with their short sides facing the edges 201 and 202 such that only a rotation over 180 degrees of the optical plates is here intended. However, alternatively the shape and/or dimensions of the printed circuit boards, the optical plates and the tray may be selected such that any one of the printed circuit boards 210-214 and/or optical plates 220-223 could be rotated by 90 degrees from a first position to a second position. In particular, receiving space and/or fixing means may be provided in the tray, allowing to rotate an optical plate alone or a printed circuit board alone or both a printed circuit board and an optical plate. If all optical plates are in the same positions, given their inherent non-rotation symmetrical properties, the optical module will have a counter beam type of lighting. If half of the optical plates are rotated by 180, the optical module will have a symmetric type of lighting. Alternatively there may also be a single optical plate for several printed circuit boards.

In addition FIG. 7 shows a realisation with four printed circuit boards 210-213 with each one LED array 215 of four rows of five LEDs, e.g. twenty LEDs, and optical plates 220-223 with an identical number of lenses each, e.g. twenty lenses. Other configurations with a different number of LEDs, or less LEDs for the same optical plate, for instance ten LEDs regularly spaced in a chessboard manner for twenty lenses, may be envisaged as well.

Figure 8A:
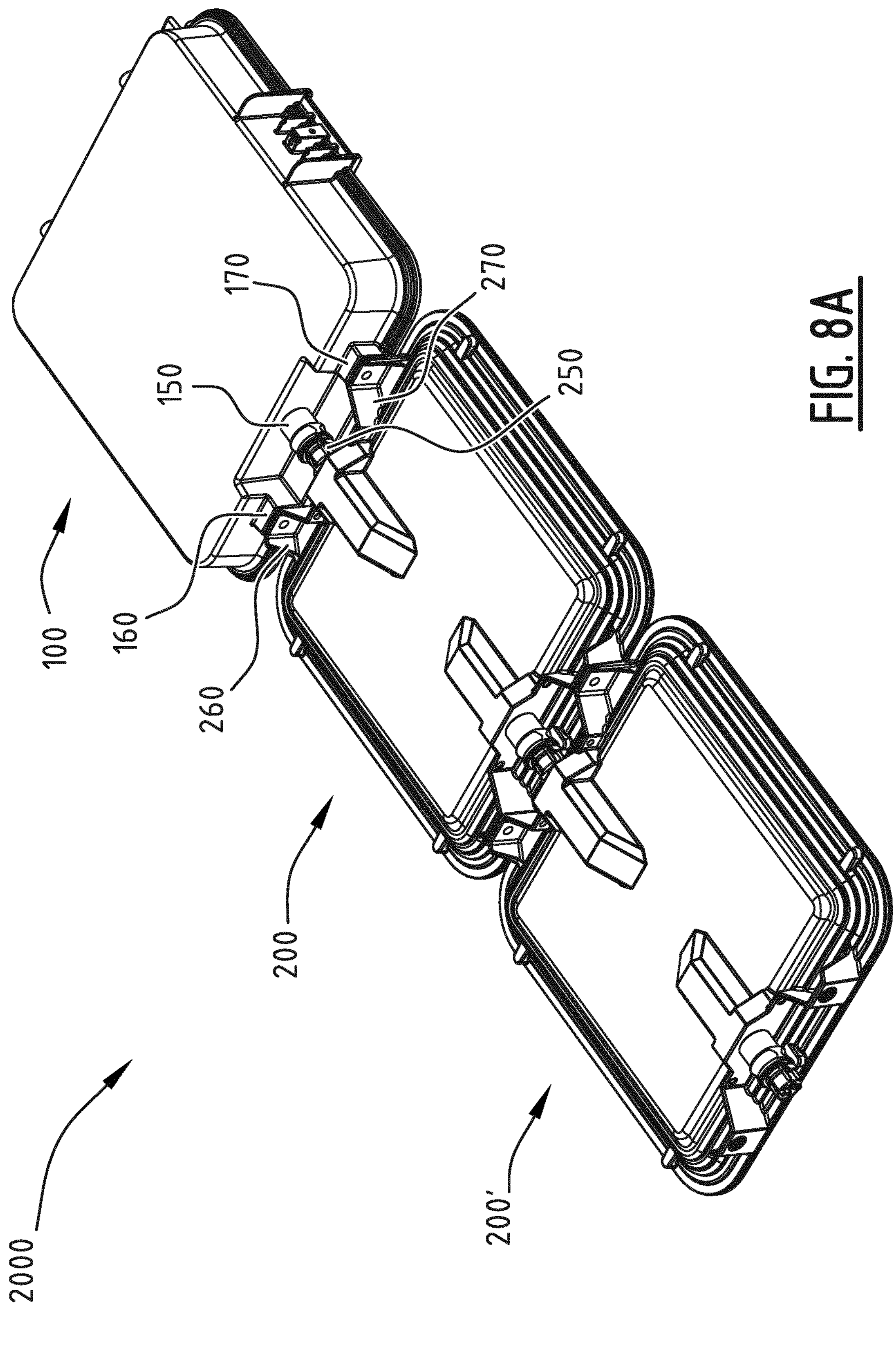
FIGS. 8A and 8B schematically illustrate a perspective view of a luminaire assembly with three and four modules according to another exemplary embodiment of the invention.
Figure 8B:
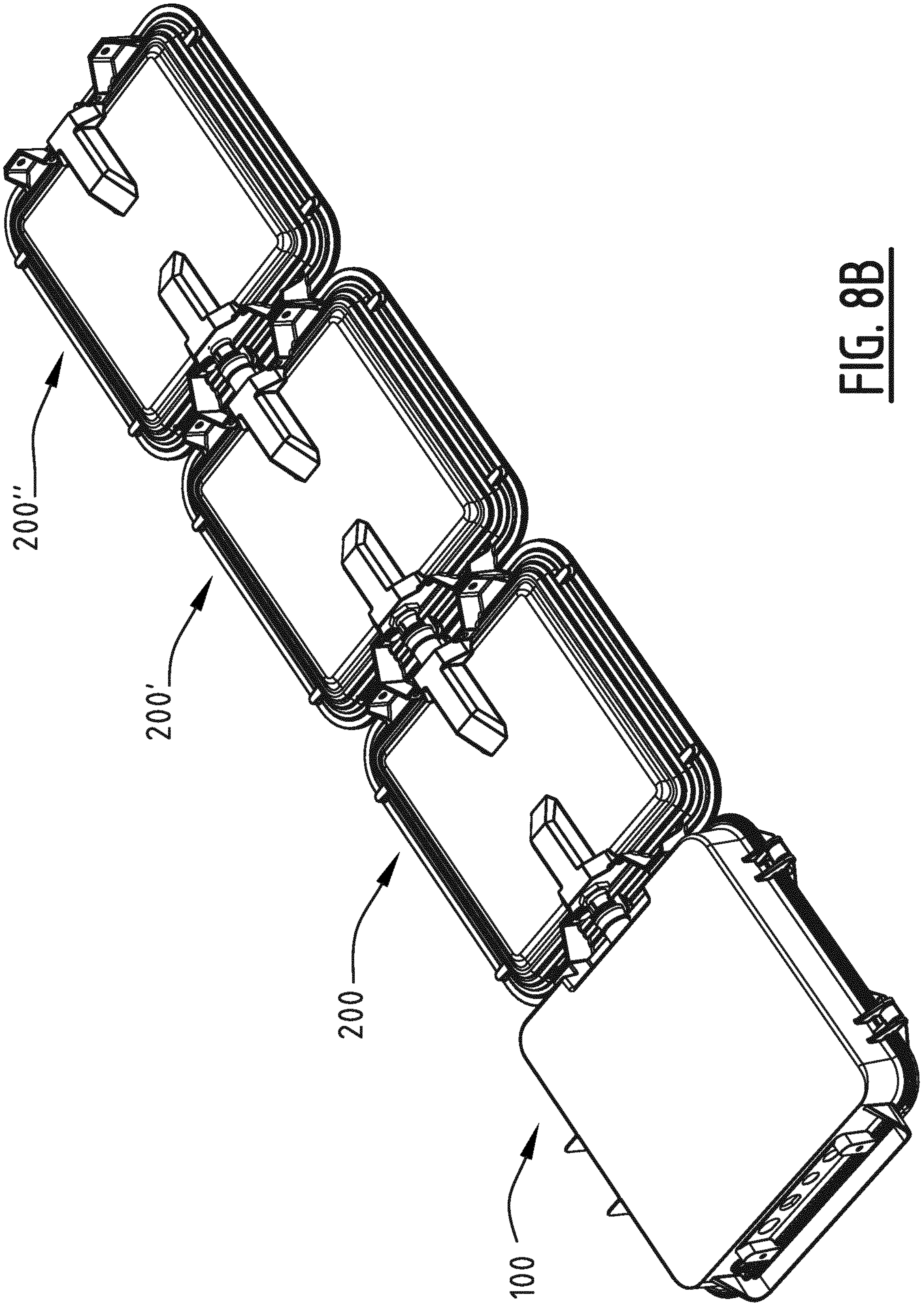

FIGS. 8A and 8B show respectively a luminaire assembly 2000, 2010 according to a second embodiment, including two, respectively three, optical modules 200, 200', respectively 200" and one electronic module 100. The same references as for the first embodiment will be used for similar elements of the second embodiment.

Alternatively to the first embodiment, in the second embodiment, the edges of the optical module 200 have a stepped profile with multiple steps. The surface of the bottom face 231 of the tray 230 is like in the first embodiment substantially smaller than the surface of the cover 240. In addition in the second embodiment, the first edge 201 of the optical module also integrates a mechanical connector interface 260, 270 configured to cooperate with a mechanical connector interface 160, 170 on the electronic module.

Figure 9:
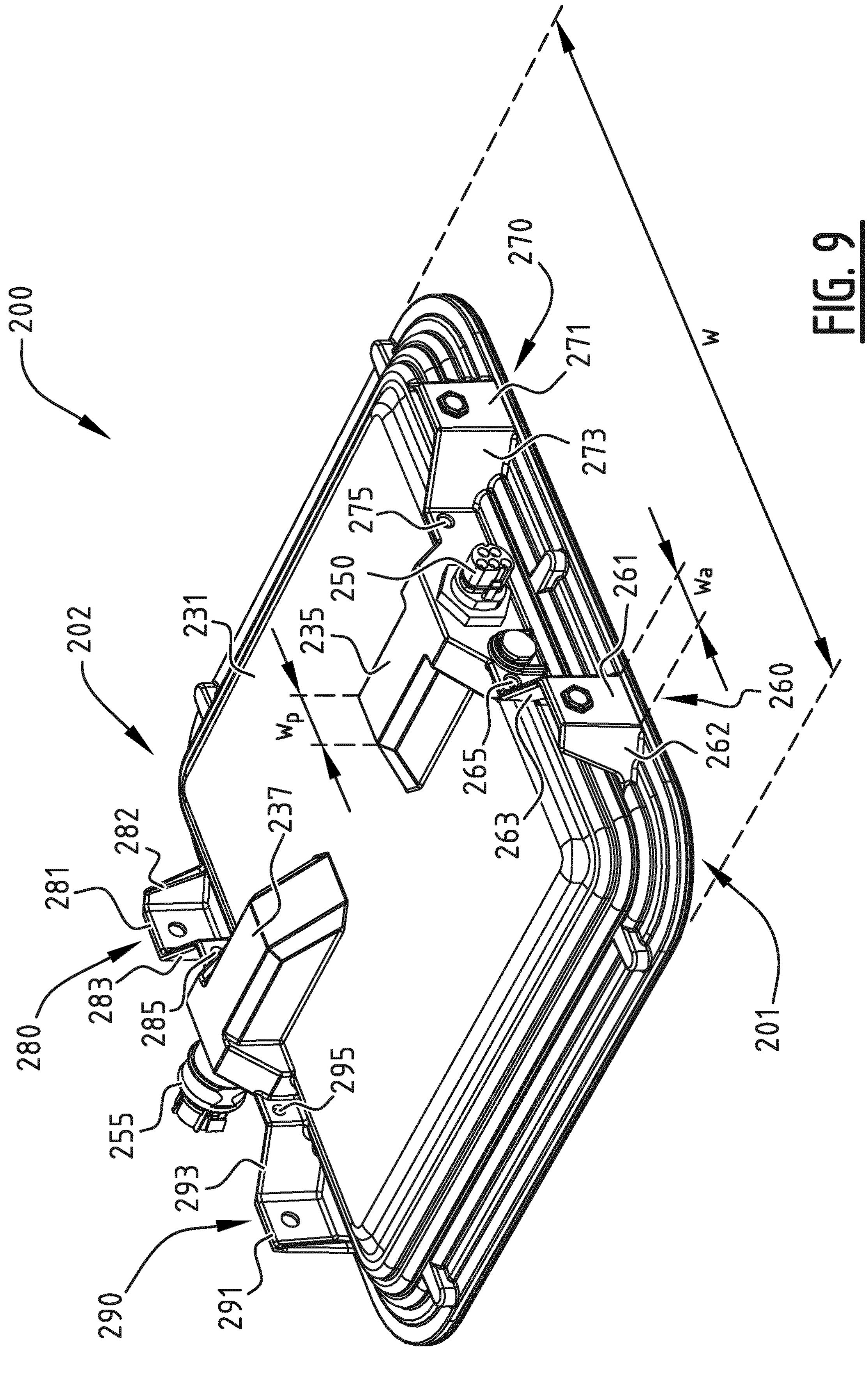
FIG. 9 schematically illustrates a close-up perspective view of an optical module as shown in FIG. 8.

FIG. 9 illustrates a close-up perspective view of an optical module 200 according to the second embodiment. The profile of the edge 201 is stepped between the outer flange for abutting against the cover 240 and the bottom surface 231 of the tray 230. The stepped profile is such that the surface of a bottom face 231 of the tray 230 is smaller than the surface of the cover 240. Preferably, the bottom surface 231 of the tray 230 of the optical module 200 is between 60% and 95% of the surface of the cover 240. The stepped profile comprises several upright side walls, extending upwardly perpendicular to the bottom face, and several outwardly extending flanges in cascade between the outer rim of stepped profile representing the peripheral edge of the optical module and the bottom surface 231 of the tray.

The protrusion 235 is integrated with a mechanical connector interface comprising two sub interfaces 260 and 270 with respective abutment portions 261 and 271 on either side of the electrical connector 250 in a symmetrical way. The abutment portions 261 and 271 may be configured for abutting against the mechanical connector interfaces 160 and 170 of the electronic module 100. Both abutment portions 261, 271 extend on a plane perpendicular to the cover plane and level with an outer rim of the stepped profile such that the modules 100 and 200 may be joined edge to edge by fixing the abutment portions of each module together. In this way the electrical connection and the mechanical connection of two adjacent modules may happen simultaneously, simplifying the mounting, and/or the maintenance. Preferably, the abutment portions 261, 271 each have a width wa measured parallel to the first edge of the tray 230 of the optical module 200, which is smaller than one fourth of a width w of the tray 230 measured parallel to the first edge thereof. The abutment portions 261 and 271 may further be used to fix the luminaire assembly mechanically to a ceiling or overhang, via additional fixing mechanisms not represented. Optionally the additional fixing mechanism may allow the first optical module to be slightly tilted in order to orient the emitted light. For example, the fixing mechanism may allow the first optical module to be either mounted horizontally or at an angle with a horizontal plane depending on the desired orientation of the emitted light beam. The abutment portions 261, 271 are further each connected on either side to the first edge 201 by two wing portions respectively 262, 263 and 272, 273. Elements 261-263 form the sub interface 260, which is integrated with the protrusion 235 and may further provide means 265 for connecting the module 200 to a ceiling or overhang as a failsafe measure via a hook or a chain. Elements 271-273 form the sub interface 270, which is integrated with the protrusion 235 and may further provide means 275 for connecting the module 200 to a ceiling or overhang as a failsafe measure via a hook or a chain.

Similarly the profile of the second edge 202 on the opposite side of the tray facing the additional optical module 200" is stepped between the outer flange for abutting against the cover 240 and the bottom surface 231 of the tray. The protrusion 237 is integrated with a mechanical connector interface comprising two sub interfaces 280 and 290 with respective abutment portions 281 and 291 on either side of the electrical connector 255. The abutment portions 281 and 291 are configured for abutting against the respective mechanical connector interfaces 260 and 270 of the additional optical module 200'. Both abutment portions 281, 291 extend on a plane perpendicular to the cover plane and level with an outer rim of the stepped profile such that the modules 200 and 200' may be joined edge to edge by fixing the abutment portions of each module together using a screw and a bolt. The abutment portions 281 and 291 may further be used to fix the luminaire assembly mechanically to a ceiling or overhang, via additional fixing mechanisms not represented. The abutment portions 281, 291 are each connected on either side to the second edge 201 by two wing portions respectively 282, 283 and 292, 293. Elements 281-283 form the sub interface 280, which is integrated with the protrusion 237 and further provides means 285 for connecting the module 200 to a ceiling or overhang as a failsafe measure via a hook or a chain. Elements 291-293 form the sub interface 290, which is integrated with the protrusion 237 and may further provide means 295 for connecting the module 200 to a ceiling or overhang as a failsafe measure via a hook or a chain.

Preferably, the protrusion 235 and/or 237 has a width wp measured parallel to the first edge 201 of the tray of the optical module 200, which is smaller than one third of a width w of the tray of the optical module 200, preferably smaller than one fourth of the width w of the optical module 200. Preferably, the width wp of the protrusion is larger than 5% of the width w of the tray of the optical module 200.

Figure 10:
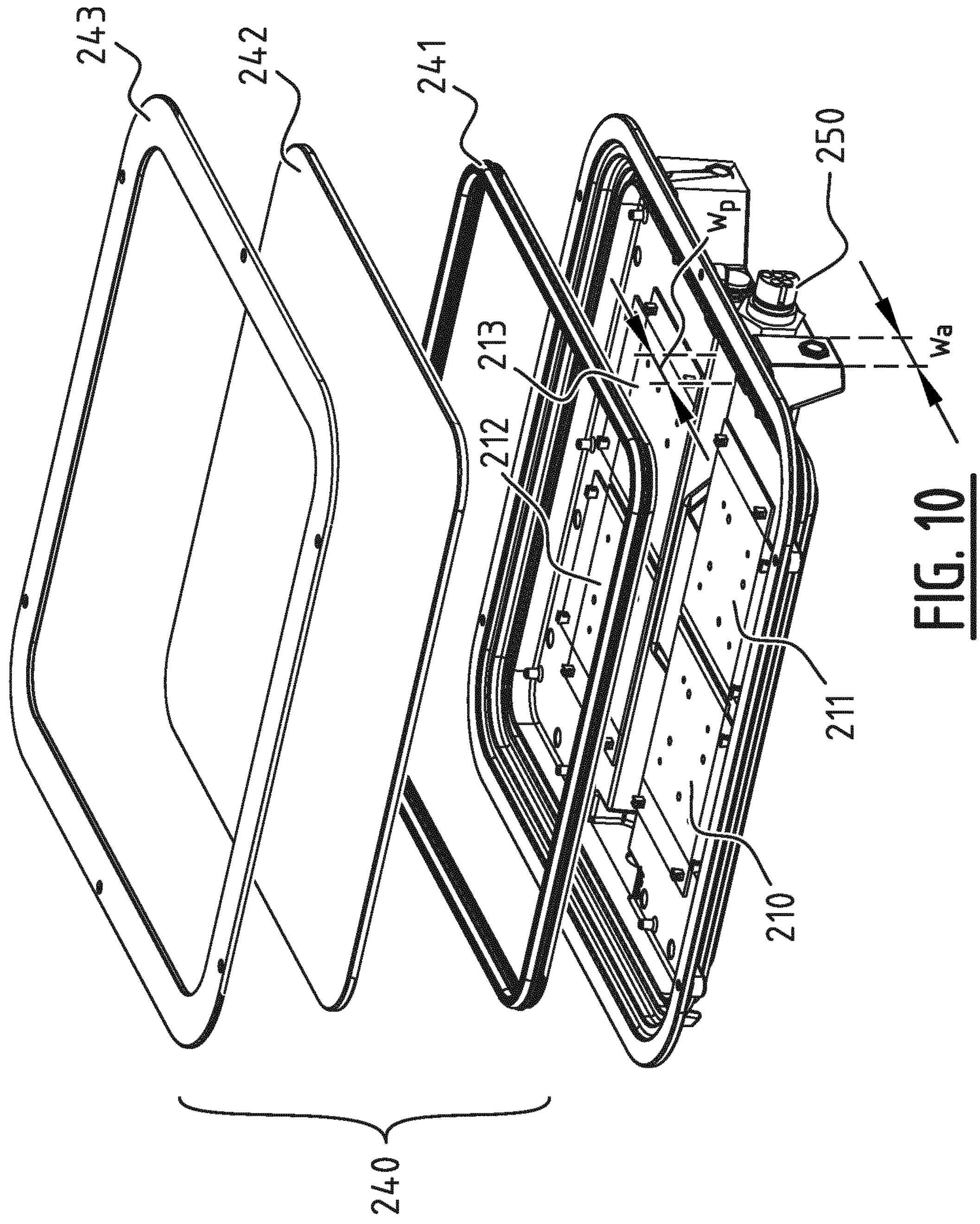
FIG. 10 schematically illustrates an exploded perspective view of an optical module as shown in FIG. 9.

FIG. 10 shows an exploded perspective view of an optical module according to the second embodiment. In particular FIG. 10 shows the cover 240 comprising a stacked arrangement of a seal gasket 241, a transparent sheet 242 and a frame 243 with fixations for fixing the cover onto the tray 230 and pressing the gasket 241 for closing the optical module. The gasket 241 comes to rest on one step of the stepped profile of the edges of the tray 230 such that the shape of the edge benefits also to the sealing of the module in addition to creating more space for connecting the mechanical interfaces together.

As illustrated in FIGS. 9 and 10, the protrusions 235 and 237 provide a central passage inside the tray 230 for the electrical wiring towards the printed circuit boards 210-213 and the electrical connectors 250 and 255. Preferably, the passage has a width wp (which substantially corresponds with the width of the protrusions 235, 237) measured parallel to the first edge of the tray of the optical module 200, which is smaller than one third of a width w of the tray of the optical module 200, preferably smaller than one fourth of the width of the optical module 200. Preferably, the width of the passage is larger than 5% of the width of the tray of the optical module 200.

Figure 11:
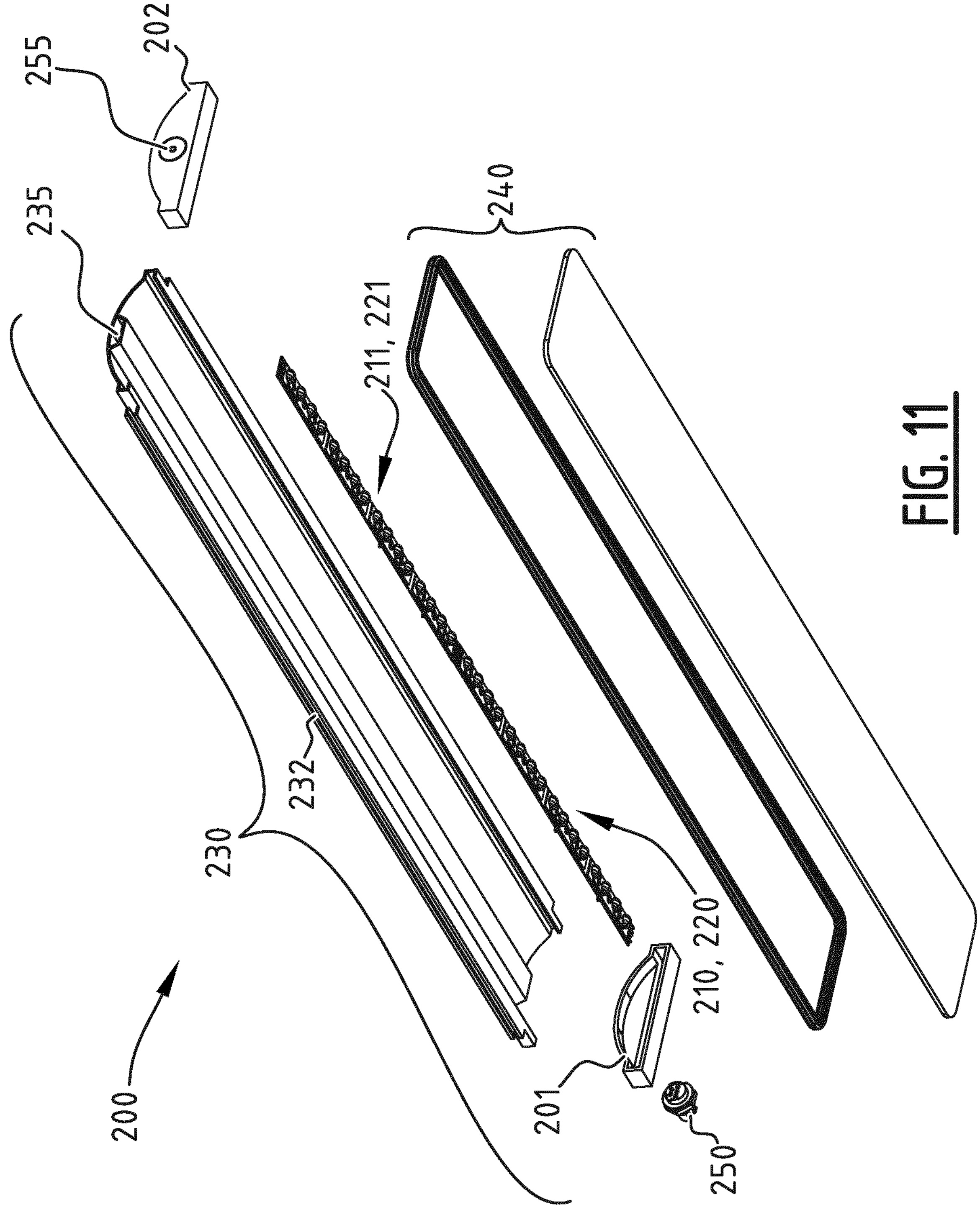
FIG. 11 schematically illustrates an exploded perspective view of an optical module of a luminaire according to another exemplary embodiment of the invention.

FIG. 11 shows an exploded perspective view of an optical module 200 of a luminaire assembly according to a third embodiment. The same references as for the first embodiment will be used for similar elements of the third embodiment. The optical module 200 of FIG. 11 differs in that its tray 230 is made of an extruded surface 232 and two edges 201 and 202, and in that the central passage 235 between both electrical connectors 250 and 255 on both edges 201 and 202 extends over the whole length of the surface 232 and is closed passage on which the circuit boards 210, 211 and the optical plates 220, 221 are mounted. Alternatively, the passage could be a protrusion running along the whole central part of the surface 232.

The circuit boards are mounted along the longitudinal direction between the edge 201 and the opposite edge 202 to form a alignment of LEDs. The boards 210, 211 contain only a single row of LEDs, such that the corresponding optical plates 220, 221 also comprise a single row of lenses, configured for generating a non-rotation symmetrical light beam. The rows of lenses can be rotated by 180 degrees with respect to their respective circuit boards.

Whilst the principles of the invention have been set out above in connection with specific embodiments, it is understood that this description is merely made by way of example and not as a limitation of the scope of protection which is determined by the appended claims.

The invention claimed is:

1. A luminaire assembly, comprising a plurality of interconnectable modules, said plurality of interconnectable modules comprising at least an electronic module and at least a first optical module, wherein the first optical module comprises at least one printed circuit board comprising at least one corresponding LED array and at least one corresponding optical plate, wherein the electronic module comprises driver circuitry for driving the at least one LED array of the at least one printed circuit board, wherein the first optical module comprises a tray containing the printed circuit board and the optical plate, and an at least partially light transmitting cover closing said tray, said tray having a bottom face and a first edge between said cover and said bottom face, wherein the electronic module comprises a tray containing the driver circuitry and a cover closing said tray, said tray having a bottom face and a first edge between said cover and said bottom face, wherein said first edge of the first optical module integrates a first mechanical connector interface and said first edge of the electronic module integrates a second mechanical connector interface, which is configured to cooperate with the first mechanical connector interface to mechanically interconnect the first optical module and the electronic module, wherein the first edge of the first optical module has a stepped profile such that the surface of bottom face of the tray is smaller than the surface of the cover, wherein the first mechanical connector interface comprises at least one first abutment portion arranged on the stepped profile and configured for abutting against the second mechanical connector interface, wherein the second mechanical connector interface comprises at least one second abutment portion arranged on the first edge of the electronic module and configured for abutting against the first mechanical connector interface, wherein the first edge of the first optical module integrates a first electrical connector, wherein the first edge of the electronic module houses a second electrical connector, which is configured to cooperate with the first electrical connector to electrically interconnect the first optical module and the electronic module, wherein the at least one first abutment portion levels with an outer rim of the stepped profile, and wherein the at least one second abutment portion levels with the first edge of the electronic module.

2. The luminaire assembly according to claim 1, further including at least one of an abutment surface of the at least one first abutment portion for physical contact with the second mechanical connector interface extends on a plane perpendicular to the cover plane, or at least one first abutment portion of the first mechanical connector interface is interconnected to the second mechanical connector interface using a bolt and a nut.

3. The luminaire assembly according to claim 1, wherein said tray of the first optical module comprises at least a first protrusion protruding outwardly out of the bottom face of said tray and integrating at the first edge the first electrical connector.

4. The luminaire assembly according to claim 1, wherein the electrical connectors and the mechanical connector interfaces of the first optical module and of the electronic module are configured such that electrical coupling and physical contact between the first optical module and the electronic module are realised simultaneously.

5. The luminaire assembly according to claim 1, wherein the tray of the first optical module further integrates at a second edge opposite the first edge a third electrical connector for interconnection with the respective electrical connector of a further adjacent module.

6. The luminaire assembly according to claim 1, wherein the first optical module comprises at least two printed circuit boards, each comprising a LED array, and at least two corresponding optical plates configured for generating a non-rotation symmetrical light beam, and wherein the first optical module is configured such that at least one of the at least two printed circuit boards or the at least two corresponding optical plates are mountable in at least two different positions in the first optical module.

7. The luminaire assembly according to claim 1, comprising a further module which is selected from a sensor module, a signaling module, and an optical module, said further module having an electrical connector which is configured to be connected to a further electrical connector of the first optical module.

8. The luminaire assembly according to claim 1, wherein the first optical module comprises four printed circuit boards each comprising a LED array and four corresponding optical plates.

9. The luminaire assembly according to claim 1, wherein for each optical module, the tray is provided with an additional protrusion, provided with a plug for transmitting additional data between the modules.

10. The luminaire assembly according to claim 1, wherein the stepped profile comprises a plurality of steps.

11. A luminaire assembly, comprising a plurality of interconnectable modules, said plurality of interconnectable modules comprising at least an electronic module and at least a first optical module, wherein the first optical module comprises at least one printed circuit board comprising at least one corresponding LED array, and at least one corresponding optical plate, wherein the electronic module comprises driver circuitry for driving the at least one LED array of the at least one printed circuit board, wherein the first optical module comprises a tray containing the printed circuit board and the optical plate, and an at least partially light transmitting cover closing said tray, said tray having a bottom face and at least a first edge between said cover and said bottom face, wherein the electronic module comprises a tray containing the driver circuitry and a cover closing said tray, said tray having a bottom face and at least a first edge between said cover and said bottom face, said tray of the first optical module comprising at least a first protrusion protruding outwardly out of the bottom face of said tray and integrating at the first edge a first electrical connector, said tray of the electronic module integrating at the first edge a second electrical connector, which is configured to cooperate with the first electrical connector to electrically interconnect the first optical module and the electronic module, wherein at least one of the first electrical connector and the second electrical connector is configured to bridge over at least one of the first edge of the first optical module and the first edge of the electronic module, wherein said first edge of the first optical module integrates a first mechanical connector interface, wherein said first edge of the electronic module integrates a second mechanical connector interface configured to cooperate with the first mechanical connector interface to mechanically interconnect the first optical module and the electronic module, wherein the tray of the first optical module has a passage extending from the first edge to a second edge opposite said first edge, said passage integrating the first protrusion, and wherein the passage houses a second protrusion protruding outwardly out of the bottom face of said tray and integrating at the second edge a third electrical connector for interconnection with the respective electrical connector of a further adjacent module.

12. The luminaire assembly according to claim 11, wherein the ratio between the height of the first protrusion and the height of the tray of the optical module is between 0.5 and 1.5.

13. The luminaire assembly according to claim 11, wherein the electrical connectors and the mechanical connector interfaces of the first optical module and of the electronic module are configured such that electrical coupling and physical contact between the first optical module and the electronic module are realised simultaneously.

14. The luminaire assembly according to claim 11, wherein the first edge of the first optical module has a stepped profile such that the surface of bottom face of the tray is substantially smaller than the surface of the cover, and wherein the first mechanical connector interface comprises at least one abutment portion arranged on the stepped profile and configured for abutting against the second mechanical interface.

15. The luminaire assembly according to claim 14, wherein at least one of a surface of the at least one abutment portion for abutment with the second mechanical connector interface extends on a plane perpendicular to the cover plane, the at least one abutment portion levels with an outer rim of the stepped profile, or at least one abutment portion of the first mechanical connector interface is interconnected to the second mechanical interface using a bolt and a nut.

* * * * *